United States Patent [19]
Drs et al.

[11] Patent Number: 5,911,819
[45] Date of Patent: Jun. 15, 1999

[54] CEMENT SPRAYING ADMIXTURE

[75] Inventors: Josef Franz Drs, Vienna, Austria; Bernhard Leikauf, Linn; Max Oppliger, Allschwil, both of Switzerland

[73] Assignee: MBT Holding AG, Zurich, Switzerland

[21] Appl. No.: 08/767,647

[22] Filed: Dec. 17, 1996

Related U.S. Application Data

[63] Continuation of application No. 08/614,596, Mar. 13, 1996, abandoned.

[30] Foreign Application Priority Data

Mar. 16, 1995 [GB] United Kingdom .................... 9505259

[51] Int. Cl.$^6$ .................................................. C04B 24/00
[52] U.S. Cl. ......................... 106/809; 106/802; 106/815; 106/819; 106/823; 106/724; 106/725; 427/397.7; 427/427
[58] Field of Search .................................... 106/802, 809, 106/819, 823, 724, 726, 725, 815, 736; 427/397.7, 427

[56] References Cited

U.S. PATENT DOCUMENTS

| | | | |
|---|---|---|---|
| 4,419,135 | 12/1983 | Hoge | 524/6 |
| 4,507,154 | 3/1985 | Burge et al. | 106/315 |
| 5,158,996 | 10/1992 | Valenti | 524/5 |
| 5,224,595 | 7/1993 | Sugimoto et al. | 106/823 |
| 5,494,516 | 2/1996 | Drs et al. | 106/809 |
| 5,609,681 | 3/1997 | Drs et al. | 106/802 |

FOREIGN PATENT DOCUMENTS

| | | |
|---|---|---|
| 0 076 927 A1 | 4/1983 | European Pat. Off. ......... C04B 13/22 |
| 0 657 398 A1 | 6/1995 | European Pat. Off. ......... C04B 28/02 |
| 58-161953 | 9/1983 | Japan . |
| 63-222005 | 9/1988 | Japan . |
| WO96/05150 | 2/1996 | WIPO ............................. C04B 28/02 |

OTHER PUBLICATIONS

French Search Report for FR 9603129 dated Apr. 8, 1997.

*Primary Examiner*—Michael Marcheschi
*Attorney, Agent, or Firm*—Fish & Richardson P.C.

[57] ABSTRACT

A method for coating a substrate with a cementitious composition by spraying, comprising the addition to the initial cementitious mix one of a β-naphthalene sulphonate-formaldehyde condensate and a water-soluble poly(alkylene oxide) of molecular weight from 100,000–8,000,000, the other being added at the spraying nozzle, there being additionally added at the nozzle (preferably as a single component with the other nozzle-added material) an accelerator selected from aluminium sulphate, aluminium hydroxide and aluminium hydroxysulphate. In a preferred embodiment, the material added at the nozzle also contains a superplasticiser.

18 Claims, No Drawings

CEMENT SPRAYING ADMIXTURE

This is a continuation of application Ser. No. 08/614,596, filed Mar. 13, 1996 now abandoned.

This invention relates to the spraying of cementitious compositions and to admixtures for use therein.

The oldest and most widely-used assessment of the workability of concrete or mortar is the slump test, defined in ASTM C143. A frusto-conical mound of concrete is moulded on a table and the mould then removed, the slump being the difference in height from the table between the top of the original mound and the level to which it falls. The bigger the slump, the better the workability.

In the case of sprayed concrete, sometimes known as "shotcrete", it is highly desirable that a concrete be pumpable (a condition which requires considerable slump), but when it is sprayed on to a substrate, that it become stiff very quickly (a condition which allows nearly no slump). A system for achieving this goal is described in PCT Published Application WO 94/02428, wherein a two-component admixture is used, one component being added at the mixing stage and the second just before final use. In the case of spraying concrete, the second component is added at the nozzle from which the concrete is sprayed. In the case of sprayed concrete, an accelerator is also used, the accelerator being added in conventional fashion (at the nozzle) and being selected from conventional accelerators.

It has now been found that a combination of the two-component admixture hereinabove described and a particular accelerator gives unexpectedly good results. There is therefore provided, according to the present invention, a process for coating a substrate with a cementitious composition, comprising the preparation of a hydraulic cementitious mix and its application on to the substrate by spraying through a nozzle, there being added to the mix one component of a two-component admixture, the other component being added at the nozzle, the components being a β-naphthalene sulphonate-formaldehyde condensate ("BNS") and a water-soluble poly(alkylene oxide) of molecular weight (weight-average) of from 100,000–8,000,000 ("PAO"), there being additionally added at the nozzle an accelerator which is selected from the group consisting of aluminium sulphate, aluminium hydroxide and aluminium hydroxysulphate ("aluminium-based compound").

In a further embodiment of the invention, the aluminium-based compound forms part of the component added at the nozzle.

In a still further embodiment of the invention, there is provided a two-component admixture for a sprayable concrete mixture which is adapted to be applied to a substrate by a spray nozzle, one of which components is incorporated at the mixing stage of the concrete mixture and the other of which is added at the nozzle, one component comprising a β-naphthalene sulphonate-formaldehyde condensate, and the other component comprising a water-soluble poly (alkylene oxide) of molecular weight (weight-average) of from 100,000–8,000,000, there being additionally present in the component which is added at the nozzle an aluminium compound selected from aluminium sulphate, aluminium hydroxide and aluminium hydroxysulphate.

The invention also provides a two-component admixture for use with a sprayable cementitious composition, of the type hereinbefore described, one component of the admixture comprising BNS and the other component comprising PAO and an aluminium-based compound.

The invention further provides a two-component admixture for use with a sprayable cementitious composition, of the type hereinbefore described, one component of the admixture comprising BNS and an aluminium-based compound, and the other component comprising PAO.

For the purposes of this invention, where reference is made to a single material, the possibility of using two or more such materials is also comprehended thereby. By "cementitious composition" is meant any cementitious composition, such as mortar and grout. However, the major use of this invention is in the field of "shotcrete" (sprayable concrete).

For the purposes of this invention, the term "two-component admixture" refers to an admixture whose two components interact with each other to achieve a result which is not given by the addition of the individual components alone and which is therefore functionally a single admixture. In this particular case, the individual components are not mixed (indeed must not be mixed) before addition to the cementitious composition, but are added separately, the second at the nozzle.

The PAO suitable for use in this invention may be selected from any such suitable materials known to the art. The requirement that the material be water-soluble means that the material must include at least a high proportion of oxyethylene units. It is preferable that the material be pure poly(ethylene oxide). It is also preferable that the molecular weight lie in the range 2,000,000–5,000,000. Typical commercial products useful in the working of this invention may be found, for example, in the "POLYOX" (trade mark) range of Union Carbide Chemicals and Plastics Company, Inc.

The BNS for use in this invention is a readily-available material, widely used as a superplasticizer in the concrete industry. It can be used as a powder but it is preferred to use an aqueous solution containing approximately 40% of active substance in the form of the sodium salt.

There has been recent interest in accelerators comprising amorphous aluminium hydroxide, largely because their low alkalinity makes conditions in spraying sites more tolerable. Examples of accelerators based on amorphous aluminium hydroxide have included blends thereof with various water-soluble salts. However, it has been found that when the aluminium-based compounds hereinabove described are used in conjunction with poly(alkylene oxide) and BNS as hereinabove described, the results are especially and surprisingly good. For example, it has been found that the achievement of thick sprayed layers on walls and ceilings is relatively easy.

In the particular circumstances of this invention, aluminium hydroxysulphate is often a better accelerator than aluminium hydroxide and is therefore preferred. It is possible to use a mixture of aluminium hydroxysulphate with aluminium hydroxide and/or aluminium sulphate, but it is preferable to use the hydroxysulphate alone. A typical commercially-available aluminium hydroxysulphate is "GECEDRAL" (trade mark) L (ex Guilini Chemie GmbH, Ludwigshafen/-Rhein, Germany).

It is possible to add either component to the mix and the other component at the nozzle. The component which is added at the nozzle contains the aluminium-based compound. The components and the aluminium-based compound are preferably added in the form of aqueous solutions or dispersions. While it is possible for the aluminium-based compound to be added separately from the component at the nozzle, it has been found that better results are achieved when the aluminium-based compound is combined with the component. In this case, both are added together in a single aqueous additive. This has the additional benefits of reducing both the complexity of the equipment and the number of materials which have to be handled.

It is preferable to add the BNS to the mix and the PAO at the nozzle. Thus, the material added at the nozzle is preferably an aqueous solution or dispersion of PAO and aluminium-based compound.

In a further preferred embodiment of the invention, there is additionally added at the nozzle in combination with the aluminium-based compound a superplasticiser which is selected from lignosulphonates, melamine sulphonate-formaldehyde condensates and styrene-maleic anhydride ("SMA") copolymer-based superplasticisers. SMA-based superplasticisers are preferred, and an especially preferred type of such plasticiser is described in U.S. Pat. No. 5,158,916 and French Published Application 2 671 090 the contents whereof are incorporated herein by reference. These are styrene-maleic anhydride-derived copolymers in free acid or salt form and selected from the group consisting of those having the following types and numbers of monomer units:

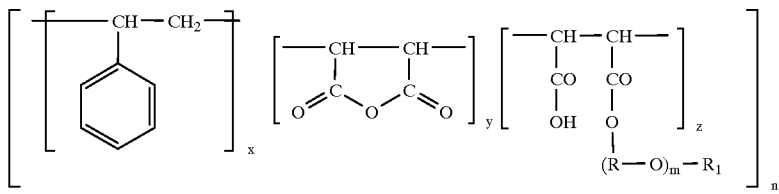

in which R is an $C_{2-6}$alkylene radical $R_1$ is a $C_{1-20}$alkyl-, $C_{6-9}$cycloalkyl- or phenyl group, x, y and z are numbers from 0.01 to 100 m is a number from 1 to 100 and n is a number from 10 to 100 with the provisos, that i) the ratio of x to (y+z) is from 1:10 to 10:1 inclusive, ii) the ratio of z:y is from 3:1 to 100:1 and iii) m+n=15–100 and those having the following types and numbers of monomer units:

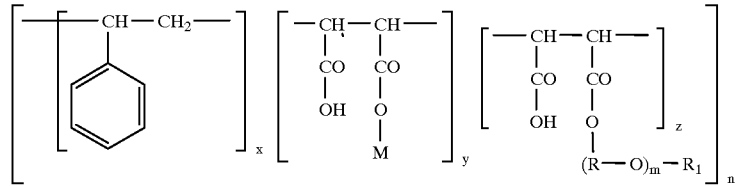

in which M is hydrogen or the residue of a hydrophobic polyalkylene glycol or polysiloxane, $R_1$, m and n are as hereinabove defined, x, y and z are numbers from 1 to 100 with the provisos that i) the ratio of x to (y+z) is from 1:10 to 10:1 inclusive, ii) the ratio of z:y is from 5:1 to 100:1 and iii) m+n=15–100.

Although the addition of a superplasticiser at a point where less flow rather than more is required is not normal, it has been found that the performance of the invention is enhanced by this addition. When the aluminium-based compound and the component added at the nozzle are included in a single aqueous additive, the superplasticiser is also included in the component. It also brings the advantage that less water is needed and the aqueous additive may be more concentrated. The invention therefore also provides a process of coating a substrate as hereinabove described, wherein there is added at the nozzle with the aluminium-based compound a superplasticiser as hereinabove described. There is also provided a two-component admixture as hereinabove described, wherein the component added at the nozzle additionally comprises a superplasticiser as hereinabove defined. This component preferably comprises PAO.

The mode of use of the invention is that one component is mixed into the concrete mix when it is made (prior to pumping) and the other component of the admixture is added at the nozzle. The substances injected at the nozzle may be injected separately, or preferably, as hereinabove described, they are pre-mixed and added as a single addition.

Use of the admixture of the present invention gives a cementitious composition which is readily pumped, but which, when it is sprayed on a substrate, forms a coating with little rebound, develops strength quickly and has good final strength.

The relative quantities of the substances to be used in the working of this invention and their relation to the quantity of concrete mix may vary over wide limits, depending largely on the composition of the mix, the desired speed with which the slump properties are to change and the desired initial and final slumps. Other factors such as ambient temperature may have an effect on the proportions needed.

With only minor experimentation the skilled person can readily determine suitable proportions in any given case. As a general guideline quantities of 0.001 to 0.01% by weight of poly(alkylene oxide) and 0.1 to 1.5% by weight of the BNS (calculated as active substance), based on the weight of cement, will be used. The ratio of poly(alkylene oxide) to BNS is from 1:100 to 1:30. When a superplasticiser is used, it is present to the extent of from 10–30%, preferably 15–25% of the aluminium-based compound (by weight on solids). The aluminium-based compound is present at a rate of from 0.1–5.0% by weight of cement.

The invention is generally applicable to all sprayable concrete mixes, where a relatively rapid transformation from an initial high slump to a final low slump is required. It is especially valuable in the creation of permanent final linings, including fiber shotcrete. It is, however, also applicable in sprayable thixotropic plastering mortar.

The invention is further described with reference to the following examples.

EXAMPLE 1

A sprayable concrete mixture is made by thoroughly mixing the following components:

Portland cement 450 Kg
aggregate (crushed stone 1700 " max. diam. 8 mm)
water 200 "
BNS (40% aqueous solution) 1.1 "

This mixture is fed to a spraying nozzle. At the nozzle, there is injected into the mixture an aqueous dispersion of the following weight constitution water 69.1 parts
polyalkylene oxide[1] 0.025 "
aluminium hydroxysulphate[2] 25.5 "
SMA-based superplasticiser[3] 5.375 "
1. "POLYOX" WSR 301 ex Union Carbide Chemicals
2. "GECEDRAL" L ex Giulini Chemie GmbH
3. "RHEOBUILD" 3520 ex MBT such that there is injected 0.02 Kg. polyalkylene oxide and 6.9 Kg. aluminium hydroxysulphate per cubic meter of concrete. The concrete is sprayed out on rock in a single pass to give a layer of thickness 30–40 cm. This layer is subjected to testing according to the Guidelines on Shotcrete published by the Austrian Concrete Society, a publication well known to those in the industry. Set is determined by the well-known Vicat needles and strength by testing drilled cores with a penetrometer. The results are as follows:

initial set 2 min.
final set 2 min. 40 sec.
strength development
   1 day 12 N/mm$^2$
   7 days 41 N/mm$^2$ The 28 day compressive strength compared to unaccelerated concrete is reduced by 12%, a remarkable improvement over shotcrete accelerated by art-recognised methods, where the loss of strength ranges from 20–50%.

EXAMPLE 2

Example 1 is repeated, using the following injected aqueous dispersion at the nozzle (the materials and proportions used being otherwise the same)

water 72.5 parts
polyalkylene oxide[1] 0.4 "
aluminium hydroxysulphate[2] 22.5 "
SMA-based superplasticiser[3] 0.5 "

The compressive strength shows the same excellent improvement over the known art.

EXAMPLE 3

Example 1 is repeated, using the following concrete mix:

Portland cement 350 Kg
fly ash 60 "
aggregate 1690 "
BNS 1.5 "

sufficient water being added to give a water/cement ratio of 0.5.

At the nozzle, the aqueous dispersion described in Example 2 is added such that there is injected 0.11 Kg polyalkylene oxide and 5.54 Kg aluminium hydroxysulphate per cubic metre. Testing results are as follows:

initial set 1 min. 20 sec.
final set 2 min. 00 sec.
strength development
   6 min. 0.35 N/mm$^2$
   1 day 18.1 N/mm$^2$
   7 days 27.9 N/mm$^2$ The loss of compressive strength in comparison with unaccelerated shotcrete is 6%.

EXAMPLE 4

The following weight-based shotcrete composition is made:

cement 425Kg/m$^3$
BNS (40% aqueous solution) 1.5%

The mix has a W/C ratio of 0.48 and a slump of 22cm and a spread of 53.5cm.

This mix is sprayed, there being added at the nozzle the aqueous dispersion of Example 2. This is added at a rate of 5% by weight solids on cement.

The compressive strength is measured over time and is as follows:

2 hours 0.9 MPa[1]
4 hours 1.3 MPa[2]
1 day 15.0 MPa[2]
7 days 25 MPa[3]
1. needle measurement
2. Hilti measurement
3. core measurement

EXAMPLE 5

A shotcrete mix is prepared as follows:

cement 425 Kg
aggregate (0–8mm) 1713 "
BNS 1.5% by weight

The W/C ratio is 0.47, the slump is 20 cm and the spread is 51 cm.

Individual samples of the mix are dosed with 4% and 5% by weight solids on cement of the aqueous dispersion of Example 2 and the compressive strengths are measured by penetration needle. The results are shown in the following table:

| accelerator dosage | strengths (MPa) measured at | | | | | | |
| --- | --- | --- | --- | --- | --- | --- | --- |
|  | 15 m. | 30 m. | 1 h. | 4 h. | 6 h. | 12 h. | 24 h. |
| 4% | 0.5 | 0.5 | 0.6 | 1.0 | 7.0 | 14.0 | 24.1 |
| 5% | 0.5 | 0.5 | 0.6 | 1.0 | 7.0 | 15.0 | 29.5 |

We claim:

1. A process for coating a substrate with a hydraulic cementitious composition by spraying said hydraulic cementitious composition through a nozzle to coat said substrate, which process comprises the steps of:

forming a first hydraulic mixture which comprises (a) cement, (b) a first component selected from: β-napthalene sulphonate-formaldehyde condensate or a water-soluble poly(alkylene oxide) of weight average molecular weight of from 100,000–8,000,000, and;

forming a second hydraulic mixture which comprises (c) a second component selected from: β-napthalene sulphonate-formaldehyde condensate or a water-soluble poly(alkylene oxide) of weight average molecular weight of from 100,000–8,000,000 wherein said second component is not present in the first hydraulic mixture, and (d) optionally a superplasticizer;

combining the said first hydraulic mixture and the said second hydraulic mixture at the nozzle with an accelerator which is selected from the group consisting of: aluminum sulphate, aluminum hydroxide and aluminum hydroxysulphate.

2. A process according to claim 1, wherein the water-soluble poly(alkylene oxide) has a weight-average molecular weight of from 2,000,000–5,000,000.

3. A process according to claim 1, wherein the β-naphthalene sulphonate-formaldehyde condensate is part of the first hydraulic mixture, and the water-soluble poly (alkylene oxide) is part of the second hydraulic mixture.

4. A process according to claim 1 wherein the accelerator is aluminium hydroxysulphate.

5. A process according to claim 1, wherein there is additionally added at the nozzle in combination with the accelerator a superplasticiser which is selected from the group consisting of lignosulphonates, melamine sulphonate-formaldehyde condensates and styrene-maleic anhydride copolymer-based superplasticisers.

6. A process according to claim 5, wherein the superplasticizer is a styrene-maleic anhydride copolymer-based superplasticizer selected from the group consisting of those according to the following general structural formula:

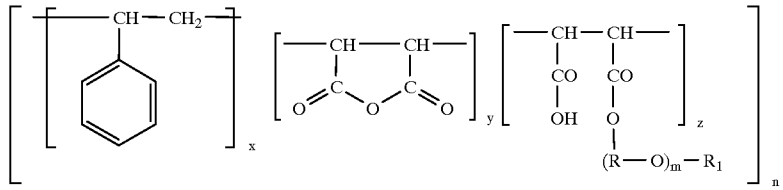

in which R is an $C_{2-6}$alkylene radical $R_1$ is a $C_{1-20}$alkyl-, $C_{6-9}$cloalkyl- or phenyl group, x, y and z are numbers from 0.01 to 100 m is a number from 1 to 100 and n is a number from 10 to 100 with the provisos, that i) the ratio of x to (y+z) is from 1:10 to 10:1 inclusive, ii) the ratio of z:y is from 3:1 to 100:1 and iii) m+n=15–100 and those according to the following general structural formula:

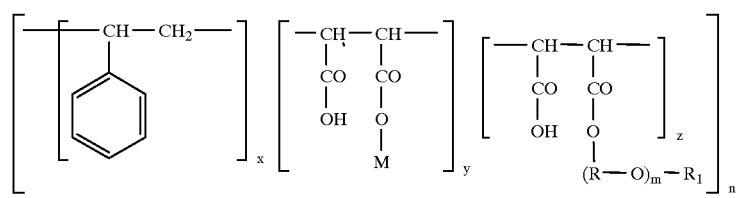

in which M is hydrogen or the residue of a hydrophobic polyalkylene glycol or polysiloxane, $R_1$, m and n are as hereinabove defined, x, y and z are numbers from 1 to 100 with the provisos that i) the ratio of x to (y+z) is from 1:10 to 10:1 inclusive, ii) the ratio of z:y is from 5:1 to 100:1 and iii) m+n=15–100.

7. A process according to claim 1, wherein in the hydraulic cementitious composition the β-naphthalene sulfonate-formaldehyde condensate is present in an amount of 0.1–1.5% by weight based on the weight of the cement, the water-soluble poly(alkylene oxide) is present in an amount of 0.001–0.01% by weight based on the weight of the cement, the relative weight ratio of poly(alkylene oxide) to β-naphthalene sulfonate-formaldehyde condensate is from 1:100–1:30 and the accelerator is present in an amount of from 0.1–5.0% based on the weight of cement.

8. A process according to claim 1, wherein the hydraulic cementitious composition further comprises a superplasticizer.

9. A shotcrete composition formed when sprayed through a nozzle to coat a substrate, which comprises:

a first hydraulic mixture which comprises (a) cement, (b) a first component selected from: β-napthalene sulphonate-formaldehyde condensate or a water-soluble poly(alkylene oxide) of weight average molecular weight of from 100,000–8,000,000, and;

a second hydraulic mixture which comprises (c) a second component selected from: β-napthalene sulphonate-formaldehyde condensate or a water-soluble poly (alkylene oxide) of weight average molecular weight of from 100,000–8,000,000 wherein second component is not present in the first hydraulic mixture, and optionally (d) optionally a superplasticizer;

and an accelerator which is selected from the group consisting of: aluminum sulphate, aluminum hydroxide and aluminum hydroxysulphate.

10. A shotcrete composition according to claim 9, wherein the water-soluble poly(alkylene oxide) has a weight-average molecular weight of from 2,000,000–5,000,000.

11. A shotcrete composition according to claim 9, which further comprises a superplasticizer which is selected from the group consisting of: lignosulphonates, melamine sulphonate-formaldehyde condensates and styrene maleic anhydride copolymer-based superplasticizers.

12. A shotcrete composition to claim 11, wherein the superplasticizer is a styrene-maleic anhydride copolymer-based superplasticizer selected from the group consisting of those according to the following general structural formula:

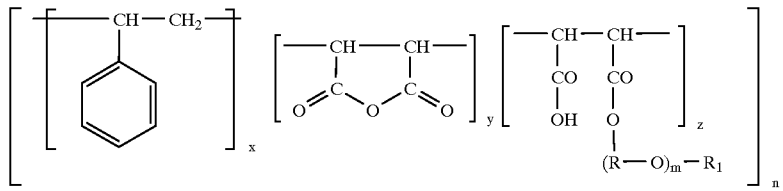

in which R is an $C_{2-6}$ alkylene radical
$R_1$ is a $C_{1-20}$ alkyl-, $C_{6-9}$ cycloalkyl- or phenyl group,
x, y and z are numbers from 0.01 to 100
m is a number from 1 to 100 and
n is a number from 10 to 100
with the provisos, that
  i) the ratio of x to (y+z) is from 1:10 to 10:1 inclusive,
  ii) the ratio of z:y is from 3:1 to 100:1 and
  iii) m+n=15–100
and those according to the following general structural formula:

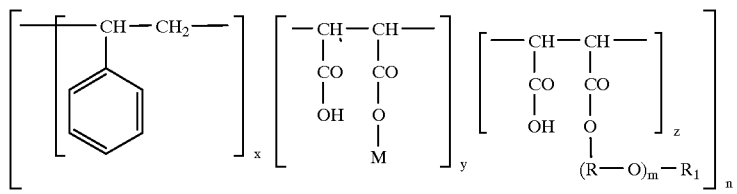

in which M is hydrogen or the residue of a hydrophobic polyalkylene glycol or polysiloxane,
$R_1$, m and n are as hereinabove defined,
x, y and z are numbers from 1 to 100
with the provisos that
  i) the ratio of x to (y+z) is from 1:10 to 10:1 inclusive,
  ii) the ratio of z:y is from 5:1 to 100:1 and
  iii) m+n=15–100.

13. A shotcrete composition according to claim 9 wherein in the hydraulic cementitious composition the β-naphthalene sulfonate-formaldehyde condensate is present in an amount of 0.1–1.5% by weight based on the weight of the cement the water-soluble poly(alkylene oxide) is present in an amount of 0.001–0.01% by weight based on the weight of the cement, the relative weight ratio of poly(alkylene oxide) to β-naphthalene sulfonate-formaldehyde condensate is from 1:100–1:30 and the accelerator is present in an amount of from 0.1–5.0% based on the weight of cement.

14. A shotcrete composition according to claim 9, wherein the sprayable hydraulic cementitious composition further comprises a superplasticizer.

15. A process according to claim 8, wherein the superplasticizer is selected from the group consisting of: lignosulphonates, melamine sulphonate-formaldehyde condensates and styrene maleic anhydride copolymer-based superplasticizers.

16. A process according to claim 7, wherein the accelerator is aluminum hydroxysulphate.

17. A shotcrete composition according to claim 9 wherein the accelerator is aluminum hydroxysulphate.

18. A shotcrete composition according to claim 13, wherein the accelerator is aluminum hydroxysulphate.

* * * * *